Jan. 5, 1932.                R. H. KEAN                 1,840,105
                          LIQUID PURIFICATION
                        Filed March 15, 1928      2 Sheets-Sheet 1

Inventor:
Robert H. Kean,
By Cromwell, Greist & Warden
Attys.

Patented Jan. 5, 1932

1,840,105

UNITED STATES PATENT OFFICE

ROBERT H. KEAN, OF CHICAGO, ILLINOIS, ASSIGNOR TO GENERAL ZEOLITE COMPANY, OF CHICAGO, ILLINOIS, A CORPORATION OF ILLINOIS

LIQUID PURIFICATION

Application filed March 15, 1928. Serial No. 261,724.

This invention relates to the treatment of liquids and particularly to the purification of water, by electro-osmotic processes.

The purification of water by the electro-osmotic processes, is carried out in cells consisting essentially of three compartments, the central one of which contains the water to be purified and the two outer ones, the electrodes, which are surrounded by liquid conductors. In practice, cells of five compartments, composed of two cathodic compartments, two water compartments and one anodic compartment, or of two compartments, one anodic compartment and one cathodic compartment, are also in use. The separators within the cells forming these compartments are diaphragms of suitable materials. The substances within the water which are removed during its purification, or treatment, migrate toward the electrodes; those negatively charged toward the anode, and those positively charged toward the cathode.

In practice it has been customary to use a number of these cells through which the water being treated flows continuously, passing from one cell to the next and so through all of them in series. The impurities migrating into the electrode compartments are flushed out of them by the continuous application of wash water to these compartments, each compartment having its own stream of wash, which flows through it and thence out of the apparatus. The wash water is usually of the same composition as the raw water to be purified. This wash water removes the impurities separated from the water in the middle compartment, and should contain a sufficiently high ionic concentration to conduct the current from the electrode to the liquid in the middle compartment. In practice the wash water has been fed into the separate electrode compartments from some type of header, containing orifices, weirs, or nozzles, which deliver an equal amount of wash water into each of the electrode compartments. Where a high degree of purification has been effected it has been customary to apply purified water as wash to some of the cells through which the processed water flows in the latter stages of its purification. The volume of all the wash water applied to the apparatus in previous practice has been about 2½ times the volume of effluent purified water produced.

In practice, difficulty has frequently been experienced due to acidity of the effluent purified water, and it has been customary to use special diaphragm materials between the anodic and central compartments of some cells in an effort to decrease or eliminate this acidity. In addition the power consumption per unit amount of water purified has been appreciably greater than necessary.

An object of this invention is to produce an electro-osmotically treated liquid of increased pH value or of decreased hydrogen ion concentration.

Another object of this invention is to produce neutral or alkaline liquids as the final product of electro-osmotic purification processes.

A further object of this invention is to produce with decreased power consumption, treated liquids or purified water by electro-osmotic purification processes.

A still further object of this invention is to obtain with less expenditure of electrical energy, treated liquids or purified water which will be neutral or alkaline.

In the electro-osmotic processes all electrically charged materials in the water of the several compartments of the cells migrate toward the electrodes—those positively charged moving toward the cathodes and those negatively charged moving towards the anodes. Thus there is a transfer of matter from the electrode compartments into the compartments containing the liquid being treated, and simultaneously from these latter compartments into the electrode compartments.

The acidity of the effluent treated liquid is caused by the existence in it of hydrogen ions. The princapal sources of these ions are the anodic compartments where they are formed by reactions at the anodes during the process of purification or treatment. Being positively charged, immediately upon their formation the hydrogen ions are attracted toward the cathodes and tend to pass into the center compartments, and so into the liquid being processed. The numbers so passing depend upon the concentrations of them existing in the liquid adjacent to the diaphragms in the anodic compartments, and upon their velocity toward the cathodes. Similary during the purification process, hydroxyl ions are formed at the cathodes, and these have an exactly analogous tendency to migrate to the anodes. The hydrogen ions and hydroxyl ions passing into the center compartments tend to neutralize each other forming water ($H^+ + OH^- = H_2O$) which is practically undissociated. The acidity or the alkalinity (pH) of the effluent treated liquid therefore depends upon the existence in it of either hydrogen ions or hydroxyl ions remaining after the above neutralization has taken place. Furthermore, any substantial acidity or alkalinity in the effluent purified liquid necessitates the existence in it of ions either negatively charged to balance the hydrogen ions or positively charged to balance the hydroxyl ions, which means that the purity of the effluent liquid will be decreased in proportion to the amounts present.

It has been found that by control of the relative quantities of hydrogen and hydroxyl ions migrating through the diaphragms, a water may be produced which will have either a neutral reaction, or an alkaline reaction, and furthermore, that by similarly regulating the concentrations of other ions and electrically charged matter migrating from the electrode compartments into the compartments containing the water being treated, the purity of water may be increased and the expenditure of electrical energy may be simultaneously decreased.

The preferred method of regulating the acidity or alkalinity of the effluent purified liquid consists in controlling the relative concentrations of hydrogen and hydroxyl ions existing at the diaphragms in the anodic and cathodic compartments, respectively, of the various cells employed. This control may be applied to all the cells, to only one cell, or to a group of cells.

A convenient method of exercising this control is by introducing into the anodic and cathodic compartments of the cells, unequal quantities of a liquid, or in the purification of water, of raw or purified wash water, per unit amount of liquid purified.

Usually in the process of electro-osmotic purification it has been found preferable to introduce an amount of water in the cathode chamber which is materially less than the amount of water introduced into the anode chamber and which is also less than the amount of water introduced into the central compartment to be purified. The combined volumes of anode and cathode wash liquors may be so controlled, at the same time or independently, so that they will be materially less than the volume of the water being purified. The ratio of the amounts, or volumes, of anode to cathode liquors, and of wash liquors to liquid being purified, may be regulated in the following manners to achieve the desirable results set forth in the aforestated objects of the invention.

In any one "unit electro-osmotic cell", the liquid flow may be so regulated that the sum of the amounts of anodic and cathodic wash liquors be not less than one-third that of the liquid being treated per unit time in the central compartment. Preferably it may be equal to one-half or even more, of the volume of liquid being treated. At the same time, the total amount of the anodic and cathodic wash liquors used in all the cells employed in the process should be not more than twice the volume of the liquid being treated. In fact it is preferable to arrange the conditions of washing, and regulate the flow of wash liquors, so that the total volume of these liquors used per unit time be materially less than twice the volume of liquid being treated, say from 0.5 to 1.75 times the volume of liquid being treated. This may be done by causing the wash liquors to flow through several cells instead of only one, as previously has been done.

In similar manner, beneficial results may be obtained by controlling the relative volumes of anodic and cathodic wash liquors employed. Thus in any unit electro-osmotic cell, or in any group of cells, or in all the cells employed in a process, the amount of anodic wash, or cathodic wash, or of both, may be so regulated that the volume of the anodic wash utilized per volume of liquid treated be from 1.2 to 5.0 times the volume of cathodic wash liquor employed. Sometimes it may be beneficial to raise the upper limit even to 10. At the same time, while exercising such control, it is preferable that the total volume of cathodic wash liquor employed in the cell or cells under consideration, be from $1/4$ to $3/4$ of the volume of liquid being treated or purified.

By using these processes, or by combination of the control methods, set forth above, it is not only possible to obtain a liquid of decreased acidity, or a neutral or an alkaline liquid, but it is also possible to reduce materially the power consumption, as will be shown by the subsequent tabulations. Decrease of the amount of cathode wash liquor used in relation to the amount of anode liquor, or in relation to the amount of liquid treated or purified, in the central compartment, may be obtained by causing the wash liquid to flow more slowly through the cathode or/and anode chambers, or by recirculating the cathode or anode liquor back through the same or through other cathode or anode chambers utilized in the process.

The acidity or alkalinity of the treated or purified liquid may also be controlled by varying the ion concentrations, particularly the concentrations of hydrogen and hydroxyl ions; or the electrical conductivity of the liquids passing into, through or out of, the anode, the cathode, or the central compartments. These control methods may be utilized in addition to, or instead, of, those methods aforestated.

Different methods of achieving this result may be summarized as follows. In first unit electro-osmotic cell of those used in any process, the hydroxyl ion concentration in the liquid in the cathode chamber should be maintained so that the ratio of the concentration of the hydroxyl ions in the cathode chamber to the concentration of electrolyte in the influent liquid to the central compartment should be more than three and preferably from 3.3 to 10.0 when these concentrations are expressed as chemical equivalent weights per unit volume of liquid. The wash liquor may be added to, and withdrawn from the cathode chamber at such a rate as to maintain the prescribed concentration, or/and the influent cathode wash liquid may be treated to increase the hydroxyl ion concentration thereof, if necessary.

Similarly, for the entire apparatus as used in any process, comprising all the cells employed, the average of the concentrations of hydroxyl ion in all the cathode compartments, or the concentration in the combined effluent cathodic wash liquors should be greater than three times the concentration of electrolyte in the liquid being supplied to the apparatus for treatment, as above stated for the first unit cell thereof.

In another method, the influent cathode wash liquid, in any or all of the cells may be treated to increase its alkalinity or increase its hydroxyl ion concentration. To achieve this result, a soluble alkaline substance, or alkali, or a solution thereof, may be added to the influent cathode wash liquor or to the liquor in the cathode chamber. An alkaline substance which will not give rise to any negative ions tending to contaminate the liquid being treated or purified in the central compartment is preferable. The soluble aluminates and alkaline hydroxides are examples of such materials and may be satisfactorily utilized. Sodium hydroxide, sodium aluminate, etc., are specific examples of this group of materials. Sodium hydroxide will give rise to negative hydroxyl ions which will combine with hydrogen ions to form water. The negative aluminate ions, by hydrolysis will form aluminum hydroxide which will be precipitated, thus preventing its remaining to contaminate the treated liquid. In many cases it is desirable that the hydroxyl ion concentration of the influent cathode liquor be greater than that of the influent anode liquor, and as stated above it may be desirable that it also be greater than that of the liquid introduced into the central compartment.

Instead of adding an alkaline substance in the manner indicated above, the effluent cathode liquid which is of decreased acidity or increased alkalinity may be added to the influent cathode liquor. The effluent cathode liquor should preferably constitute not less than 30% of the influent cathode liquor.

To increase the hydrogen ion concentration in the anode chamber, the effluent anode liquid may also be recirculated and/or acid materials may be added to the influent anode wash liquor or to the liquor in the anode compartment. As a result of such increased ion concentration the liquor in the anode compartment will have an increased electrical conductivity. Such acid materials should be added as will not cause contamination of the liquid in the central compartment. When the positive ions yielded by the substance are only hydrogen ions such a desirable effect will be obtained. The negative ions are attracted toward the anode, and the positive ions, namely hydrogen ions, will migrate into the central compartment and combine with hydroxyl ions therein to form water. Sulphuric acid is one of the materials which may be added for this purpose. Other acids may also be used. The concentration of the hydrogen ions in the anode compartment should not be permitted to rise to such an extent that there will be more hydrogen ions passing into the central compartment per unit time from the anode chamber than there are hydroxyl ions passing into the central compartment from the cathode compartment, as this would result in an undesirable increased acidity or decreased alkalinity of the liquid in the central compartment. It is thus readily seen that the recirculation of the affluent anode and cathode liquor into either the same or other anode and cathode chambers respectively, insures an advantageous decrease of acidity of the liquid being treated and also insures a decreased power loss in the electro-osmotic process inasmuch as the resistance of the liquors in the anode and cathode and compartments is materially decreased.

In the case of the recirculation of the anode effluent liquor, the influent anode liquor should preferably contain not less than 30% of the recirculating effluent anode liquor.

If desired a continuous wash liquor flow may be maintained through several or all of the anode and cathode compartments of the electro-osmotic purification apparatus in the same direction as the liquid being treated or purified. In this case the ionic concentration in the electrode wash liquors will increase as the process continues while the ion concentration in the central compartments will decrease as the process continues. If it is desired to use purified water in the last unit electro-osmotic cells for the attainment of very high degrees of purification the flow of the anode and cathode wash liquors may be caused to take place counter-current to the flow of liquid being treated. In this latter continuous wash process, as the liquid being treated increases in purity toward the end of the process, it will thus be placed next to electrode wash liquors of increasing purity.

As pointed out above, the invention in part consists in the attainment of a greater degree of purification or treatment with a decreased consumption of electrical energy, by controlling, preferably by increasing, the concentrations of positive ions and other positively charged matter existing in the solutions in the anode compartments, and the concentrations of negative ions and other negatively charged matter existing in the solutions in the cathode compartments.

It may also be desired to recirculate the cathode liquor into the influent liquor passing into a central compartment. This may be done in order to increase the alkalinity of the liquid to be treated, and/or to precipitate some of the impurities in such liquid prior to the electro-osmotic treatment. If this is done, the mixture should be allowed to settle, for there is a strong tendency for the precipitate to settle upon the diaphragms and to coat them so as to render them less permeable. The cathode liquor should not be utilized to make up the entire volume of the influent liquid flowing into the central chamber to be purified, and preferably it should not make up more than 50% of such influent liquor to be purified.

When in the initiation of the process, it is desirable to flow an influent liquid into the central compartment which has an increased hydroxyl ion concentration, it is also desirable to have a still greater hydroxyl ion concentration in the cathode wash liquor. The relative ion concentration of the cathode liquor and liquor being treated may be conveniently stated in terms of the conductivity of the influent cathode wash liquor and the conductivity of the liquid being treated. In general in the initiation of the electro-osmotic purification process it is desirable to use an influent cathode wash liquor which has a specific electrical conductivity of more than $25 \times 10^{-6}$ reciprocal ohms per square centimeter per centimeter greater than the specific electrical conductivity of the liquid to be treated when these conductivities are measured at 25° C.

The following tabulations indicate the effect of the above described controlling methods upon the acidity or alkalinity of the effluent treated liquid and they also indicate the effect of these varying control methods upon the power consumption per unit amount of water purified or liquid treated. The following table designated "Table A" illustrates the effect of varying the relative rates of flow of the water in the middle compartment and of the wash water in the anode and cathode compartments upon the hydrogen ion concentration or pH value of the effluent treated water.

Table A 6-5 compartment cells
Wash water last cell pure water

| Run number | Relative rates of flow | | | pH of effluent treated water | Concentration total solids | |
|---|---|---|---|---|---|---|
| | Effluent treated water | Anodic wash water | Cathodic wash water | | Influent | Effluent |
| SERIES I | | | | | | |
| IV—23 | 1.00 | 0.41 | 1.05 | 4.0 | 338 | 16 |
| IV—26 | 1.00 | 0.74 | 0.78 | 4.2 | 331 | 11 |
| IV—28 | 1.00 | 1.12 | 0.43 | 5.9 | 338 | 14 |
| SERIES II | | | | | | |
| IV—25 | 1.00 | 1.13 | 2.61 | Less than 3.0 | 346 | (*) |
| IV—27 | 1.00 | 1.57 | 1.70 | 3.2 | 337 | (+) |
| IV—29 | 1.00 | 2.04 | 0.72 | 8.8 | 342 | |

* Contained 76 P. P. M. of mineral acidity (expressed as P. P. M. of Ca CO₃).
+ Contained 26 P. P. M. of mineral acidity (expressed as P. P. M. of Ca CO₃).

In the above table Lake Michigan water containing an additional 100 P. P. M. of sodium sulphate and sodium chloride each making a total of about 345 P. P. M. of total solids was utilized. It will be noted from the above table that when the ratio of flow of the cathodic wash water to the flow of anodic wash water is decreased, the pH value of the effluent water increases, while if this ratio is increased the pH value of the effluent water decreases. When the rate of flow of the cathodic wash liquid is materially greater than the anodic wash liquid, very strongly acid solutions will be produced as appears from runs numbered IV—23, IV—25 and IV—27. In these latter two cases the acidity was so high that it was impossible to determine accurately the quantity of solids in the effluent water by the usual method of evaporation. In will be noted in all cases, however, especially in runs numbered IV—23, IV—26 and IV—28 that the total solids are reduced to but a fraction of the content in the influent raw water.

In the following tabulation designated "Table B" the effect of varying the ratio of flow of the water being purified in the central compartment to the total wash upon the power consumption is clearly indicated.

Table B

| Run number | Relative rates of flow | | Total solids in feed | Total solids in eff. treated water | Watt hours per gallon of eff. treated water |
|---|---|---|---|---|---|
| | Effluent treated water | Total wash | | | |

SERIES I
10-3 compartment cells
Pure wash water in last two cells

| IV—15 | 1.00 | 2.02 | 1.40 | 20 | 49.2 |
| IV—14 | 1.00 | 1.68 | 1.41 | 11 | 42.6 |
| IV—13 | 1.00 | 1.43 | 1.39 | 8 | 36.9 |

SERIES II
6-5 compartment cells
Pure wash water in last cell

| IV—30 | 1.00 | 3.05 | 341 | 26 | 150 |
| IV—31 | 1.00 | 1.90 | 338 | 17 | 141 |
| IV—32 | 1.00 | 0.97 | 348 | 7 | 123 |

In the above table Chicago city water containing 140 P. P. M. of solids was used in Series I. In Series II a similar solution was used as in "Table A" in which 100 P. P. M. of sodium chloride and sodium sulphate each were added to Chicago city water, resulting in a total dissolved solid content of about 340 P. P. M. It will be noted that as the ratio of total wash to treated water is decreased the power consumption also decreases. In Series I, a greater purification is obtained in run number IV—13 with the utilization of about 37 watt hours per gallon of effluent treated water than is obtained with 49 watt hours in run number IV—15. Similar results appear from the tabulation in Series II. These tabulations clearly show that with proper regulation of the rates of flow of the total wash and effluent treated water, it is possible to obtain a greater degree of purification with a lessened power consumption per volume of effluent treated water.

Table C, which is based partly upon theoretical considerations, indicates typical results which may be obtained by the application of the above described control methods. A summary of typical results obtained by employing the methods of the prior art is also given for the purpose of comparison.

In the above table the letter "B" represents an univalent basic ion or radical, while "A" represents an univalent acidic ion or radical. Furthermore it has been assumed that the water to be treated contains only the salt BA. The acid and base from which this salt may be produced, and into which it may be decomposed by electrolysis are designated HA and BOH respectively.

The concentrations are all expressed as chemical equivalent weights per unit volume of liquid. The rates of flow are expressed as the number of these unit volumes flowing per unit time. The consumption of electricity is expressed as the faradays consumed per unit time.

Table I—C represents the results obtained under various conditions by the methods of the prior art, and table II—C represents the results obtained by the application of the control methods of the present invention to similar conditions. The tables are so arranged that Example 1 of Table I—C may be compared with Example 1 of Table II—C and so forth.

Table C

| Example | Concentrations* | | | | | | Rates of flow | | | Ratios | | | | Faradays consumed per unit of time |
|---|---|---|---|---|---|---|---|---|---|---|---|---|---|---|
| | Influent | | | Effluent | | | | | | | | | | |
| | Raw water | Anode wash | Cathode wash | Treated water | Anode wash | Cathode wash | Treated water | Anode wash | Cathode wash | $\frac{OH-\text{in eff. cath. wash}}{H+\text{in eff. anode wash}}$ | $\frac{\text{Flow cath. wash}}{\text{Flow anode wash}}$ | $\frac{\text{Flow total wash}}{\text{Flow treated water}}$ | $\frac{OH-\text{in eff. cath. wash}}{BA \text{ in inf. raw water}}$ | |

Table I—C

| 1 | 1BA | 1BA | 1BA | 0 | 3HA | 3BOH | 1.0 | 1.0 | 1.0 | 1.0 | 1.0 | 2.0 | 3.0 | 3 |
| 2 | 3BA | 3BA | 3BA | 0 | 9HA | 9BOH | 1.0 | 1.0 | 1.0 | 1.0 | 1.0 | 2.0 | 3.0 | 9 |
| 3 | 3BA | 3BA | 3BA | 0 | 9HA | 9BOH | 3.0 | 3.0 | 3.0 | 1.0 | 1.0 | 2.0 | 3.0 | 27 |
| 4 | 3BA | 3BA | 3BA | 1BA | 8HA | 8BOH | 3.0 | 3.0 | 3.0 | 1.0 | 1.0 | 2.0 | 2.67 | 24 |
| 5 | 3BOH | 1BA | 1BA | 0 | 2HA | 5BOH | 1.0 | 1.0 | 1.0 | 2.5 | 1.0 | 2.0 | 1.67 | 5 |

Table II—C

| 1 | 1BA | 1BA | 1BA | 0 | 3.33HA | 5.0BOH | 1.0 | .060 | 0.40 | 1.5 | 1.5 | 1.0 | 5.0 | 2 |
| 1-A | 1BA | 1BA | 1BA | 0 | 3.89HA | 5.83BOH | 1.0 | 0.45 | 0.30 | 1.5 | 1.5 | 0.75 | 5.83 | 1.75 |
| 1-B | 1BA | 1BA | 1BA | 0 | 3.0HA | 6.0BOH | 1.0 | 0.67 | 0.33 | 2.0 | 2.0 | 1.0 | 6.0 | 2 |
| 2 | 3BA | 3BA | 3BA | 0 | 10.HA | 15.BOH | 1.0 | 0.60 | 0.40 | 1.5 | 1.5 | 1.0 | 5.0 | 6 |
| 3 | 3BA | 3BA | 3BA | 0 | 10.HA | 15.BOH | 3.0 | 1.8 | 1.2 | 1.5 | 1.5 | 1.0 | 5.0 | 18 |
| 4 | 3BA | 3BA | 3BA | 1BA | 8.33HA | 12.5BOH | 3.0 | 1.8 | 1.2 | 1.5 | 1.5 | 1.0 | 4.17 | 15 |
| 5 | 3BOH | 1BA | 1BA | 0 | 1.67HA | 10.BOH | 1.0 | 0.6 | 0.4 | 6.0 | 1.5 | 1.0 | 3.3 | 4 |

* Note: All concentrations expressed as chemical equivalent weights per unit volume.

In Table II—C, a comparison of Example 1 with 1—A shows the saving of electricity effected by reducing the ratio of the total flow of wash to the flow of treated liquid. Thus a reduction of the ratio from 1.0 to 0.75 causes a reduction of faradays consumed from 2.0 to 1.75.

Similarly, a comparison of Example 1 with IB shows the effect of changing the relative flows of cathodic and anodic wash while maintaining their total volume constant. The faradays consumed is unchanged but the concentration of hydroxyl ion in the cathodic compartment increases as the ratio is increased.

A comparison of Example 1 in each table shows the beneficial effect obtained by controlling both of these ratios simultaneously according to the methods of this invention. Thus, a reduction from 2 to 1 in the ratio of total volume of wash to the volume of liquid treated, causes a reduction in the faradays consumed from 3 to 2, and a change from 1 to 1.5 in the ratio of volume of cathodic to anodic wash increases the cathodic hydroxyl ion concentration from 3 to 5.

Examples 1 and 2 in each table show the effect of varying the concentration of solids in the liquid to be treated; and Examples 2 and 3, the effect of changing the rate of flow. The relative volumes of wash waters and treated water are held constant. It may be seen that the faradays consumed under these conditions are in direct proportion to the solids removed from the liquid, but that in Table II—C the consumption is less than in the corresponding example in Table I—C.

Examples 3 and 4 of Tables I—C and II—C show the effect of varying the degree of purification, and examples 1 and 5, in each table, show the results obtained by the use of effluent cathodic wash as feed water.

In the drawings accompanying this application are shown several diagrammatic illustrations of different arrangements of the electro-osmotic apparatus for carrying out the processes of the present invention.

Figure 1:
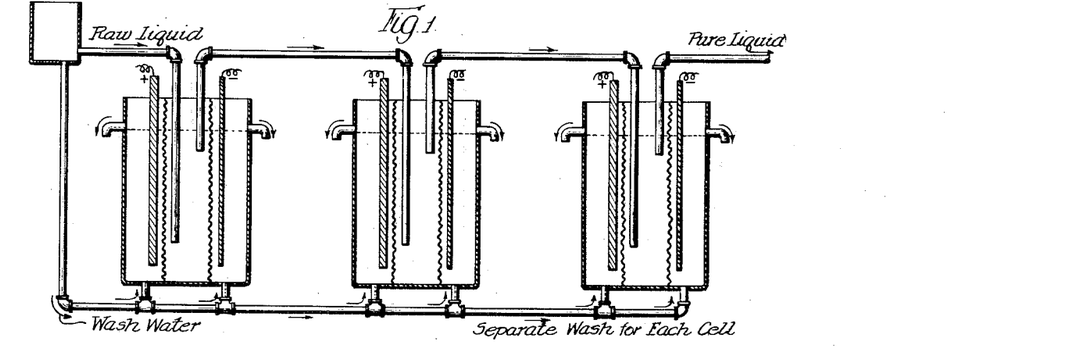
Fig. 1 shows a series of three electro-osmotic cells in which each cell has a separate and individual flow of wash liquid.
Figure 2:
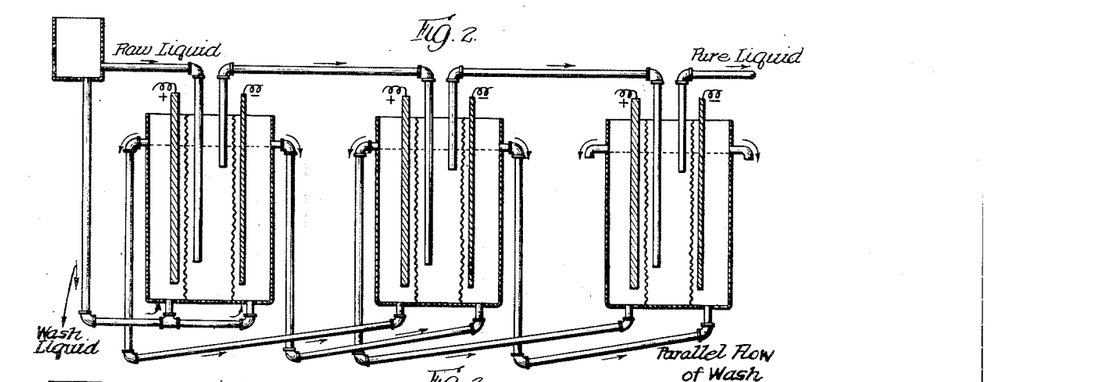
Fig. 2 shows a similar series of three electro-osmotic cells in which the anodic and cathodic wash liquid flows parallel to the liquid being treated through all three cells.
Figure 3:
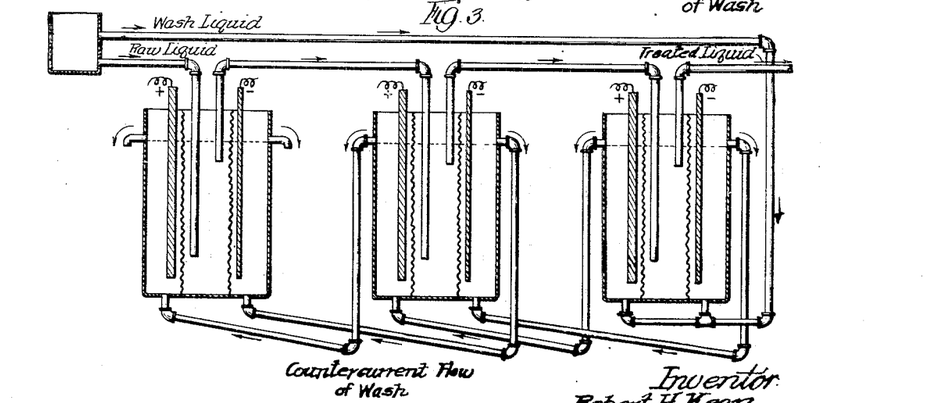
Fig. 3 shows a series of three electro-osmotic cells in which the wash liquid flows successively through all three cells in a direction counter-current to the flow of the liquid being treated.
Figure 4:
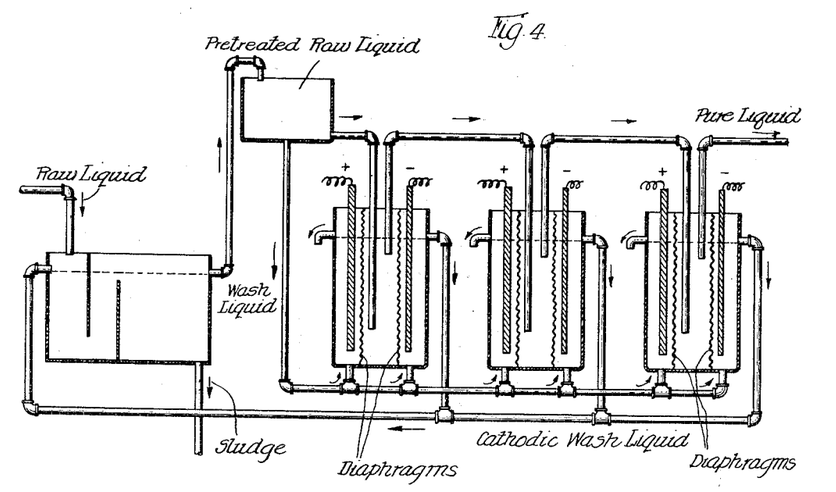
In Fig. 4 the influent raw liquid for the process is pretreated with the effluent cathodic wash liquid. After such pretreatment the liquid is allowed to settle and the sludge is removed therefrom before the liquid is utilized in the electro-osmotic process.
Figure 5:
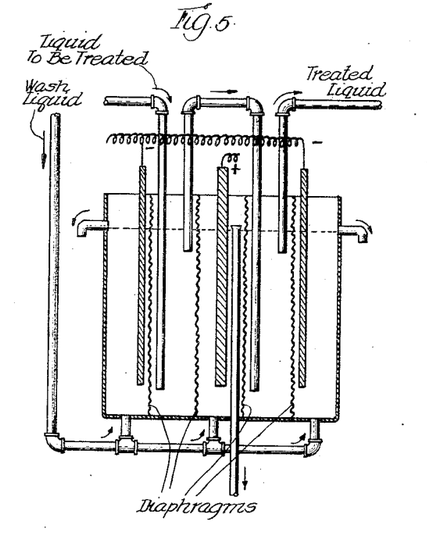
Figures 5 and 6 are enlarged showings of a five compartment cell and a three compartment cell respectively. Either of these cells may be used as the basic treatment or purification cell of the electro-osmotic apparatus.
Figure 6:
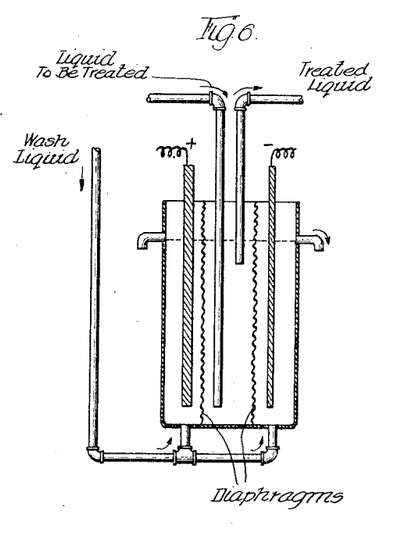

By the expression "unit electro-osmotic cell" is meant an electro-osmotic cell which comprises an anode and a cathode between which there is a conducting fluid medium, the current from said anode flowing to said cathode through said conducting fluid medium, and a middle compartment between said anode and said cathode in which the portion of the conducting fluid medium being treated is placed. Sometimes the middle compartment may be combined with one of the electrode compartments.

The expression "ion" as used in the specification and claims is broad enough to include all charged particles which will move from one electrode to another under the influence of a voltage gradiant.

What is claimed is:

1. A process of electro-osmotically treating liquids which comprises maintaining electric potential gradients in a series of bodies of the liquid being treated by a series of positive and negative electrodes, immersing said electrodes in other bodies of liquids in electrical contact with the bodies of liquid being treated, and maintaining in the bodies of liquid around the negative electrodes such concentrations of hydroxyl ions that the average concentration of hydroxyl ions for the series of such bodies of liquid is greater than three times the initial concentration of electrolytes in the liquid being treated, when these concentrations are expressed as chemical equivalent weights per unit volume of liquid.

2. In the electro-osmotic treatment of liquids in a series of electro-osmotic cells the step of maintaining within the liquid around the cathode of the first cell into which the liquid to be treated is introduced an hydroxyl ion concentration greater than three times the initial concentration of electrolytes in the liquid being treated, when these concentrations are expressed as chemical equivalent weights per unit volume of liquid.

3. In the electro-osmotic purification of water in a series of electro-osmotic cells, the step of maintaining within the water in the cathodic compartments of all the cells employed, such concentrations of hydroxyl ions that the average concentration of hydroxyl ions for such cathodic compartments is greater than three times the initial concentration of electrolytes in the water to be purified when these concentrations are expressed as chemical equivalent weights per unit volume of water.

4. A process of electro-osmotically treating a liquid which comprises causing a body of the liquid to flow between a series of pairs of positive and negative electrodes, impressing upon the liquid an electromotive force by means of such electrodes, separating said liquid from direct contact with said electrodes by other bodies of liquids flowing around said electrodes, and proportioning the flow of the several bodies of liquid so that the total volume of liquid flowing around the negative electrodes is less than the volume of liquid being treated.

5. In the electro-osmotic purification of water, the step of utilizing a volume of cathodic wash water equal to between 0.25 to 0.75 the volume of water being purified.

6. A process of electro-osmotically treating a liquid which comprises passing a body of the liquid between the pair of positive and negative electrodes, maintaining within the body of liquid an electric potential gradient by means of such electrodes, separating the body of liquid from such electrodes by other bodies of liquids passing in electrical contact with and between the body of liquid being treated and the electrodes, and proportioning the volumes of the several bodies of liquids so that the volume of liquid passing in contact with the negative electrode is less than the volume of liquid passing in contact with the corresponding positive electrode.

7. In the electro-osmotic purification of water, the step of passing a volume of wash water in contact with any cathode equal to between 0.10 to 0.85 the volume of water passing in contact with the corresponding anode.

8. A process for electro-osmotically treating liquids which comprises placing the liquid between a pair of positive and negative electrodes, preventing the electrodes from contacting immediately with the liquid being treated by introducing other liquids between the electrodes and the liquid being treated, causing such separating liquids to be in electrical contact with said electrodes and said liquid being treated, and impressing upon the liquid being treated an electromotive force by means of said positive and negative electrodes, the liquid introduced between the negative electrode and the liquid being treated having a greater pH than the liquid similarly introduced between the corresponding positive electrode and the liquid being treated.

9. A process of electro-osmotically treating a liquid which comprises passing a body of the liquid between positive and negative electrodes, maintaining within the body of liquid being treated an electric potential gradient by means of such electrodes, protecting the body of the liquid being treated from immediate contact with said electrodes by means of other bodies of liquid, and providing that such latter bodies of liquid should have a specific electrical conductivity of 25 x 10$^{-6}$ reciprocal ohms per square centimeter greater than the initial specific electrical conductivity of the liquid being treated, when these conductivities are measured at a temperature of 25° C.

10. In the electro-osmotic treatment of liquids, the step of increasing the hydroxy ion concentration of the liquid in contact with a cathode by adding an alkaline material thereto.

11. In the electro-osmotic treatment of liquids, the step of recirculation of effluent cathodic wash liquor around a cathode.

12. In the electro-osmotic purification of water, the steps of mixing effluent cathodic wash liquor with influent wash liquor and utilizing this mixture as wash liquor for a cathode.

13. A process of electro-osmotically treating a liquid which comprises maintaining electric potential gradients in a series of bodies of the liquid being treated by a series of positive and negative electrodes, passing said bodies of liquids between but not in immediate contact with said electrodes, passing around said electrodes and in electrical contact with said liquid being purified and said electrodes, other bodies of liquid in such proportions that the combined volume of all the bodies of liquids so passed in contact with the electrodes is less than twice the volume of liquid being treated.

14. In the electro-osmotic purification of water in a series of electro-osmotic cells, the step of utilizing a total volume of wash water between 0.25 and 1.75 of the volume of water being treated.

15. A process of electro-osmotically treating a liquid which comprises impressing electromotive force upon a body of the liquid being treated by means of positive and negative electrodes in electrical contact with other bodies of liquid, but not in direct contact with said body of liquid being treated, said second bodies of liquid being placed in electrical contact with said body of liquid being treated, and treating said second mentioned bodies of liquid to increase the electrical conductivity of said second mentioned bodies of liquid and decrease the resistance drop between the electrodes.

16. In the electro-osmotic purification of water, the steps of increasing the hydroxyl ion concentration of the cathodic wash water and the hydrogen ion concentration of the anodic wash water by adding hydroxyl ion yielding and hydrogen ion yielding materials thereto respectively.

17. A process of electro-osmotically treating a liquid which comprises causing the liquid to flow between pairs of positive and negative electrodes, maintaining within the liquid an electric potential gradient by means of such electrodes, separating said liquid from immediate contact with said electrodes by other bodies of liquid flowing around such electrodes, and recirculating such other bodies of liquid around an electrode of similar sign.

18. A process of electro-osmotically treating liquids which comprises passing a body of the liquid being purified between but not in direct contact with pairs of positive and negative electrodes, impressing upon the body of liquid being purified an electro-motive force by means of such electrodes, passing around said electrodes in electrical contact with and between said electrodes and said body of liquid being purified, other bodies of liquid and proportioning said other bodies of liquid so that the combined volumes of said other liquids passing around any positive electrode and the corresponding negative electrode are more than one-third the volume of liquid being treated.

19. In a process of electro-osmotically treating liquids the step of maintaining in the bodies of liquid around the negative electrodes such concentrations of hydroxyl ions that the average concentration of hydroxyl ions for the series of such bodies of liquid is greater than three times the initial concentration of electrolytes in the liquid being treated, when these concentrations are expressed as chemical equivalent weights per unit volume of liquid.

20. In a process of electro-osmotically treating liquids the step of proportioning the volumes of the several bodies of liquids so that the volume of liquid passing in contact with the negative electrode is less than the volume of liquid passing in contact with the corresponding positive electrode.

21. In a process for electro-osmotically treating liquids the step of introducing a liquid adjacent to the negative electrode having a greater pH than the liquid similarly introduced adjacent to the corresponding positive electrode.

22. In a process of electro-osmotically purifying a liquid the step of processing the body of liquid in contact with an electrode and not being purified to increase its electrical conductivity and to decrease the resistance drop through it.

23. In a process of electro-osmotically treating a liquid the step of recirculating an effluent body of electrode wash liquid around an electrode of similar sign.

24. A process of electro-osmotically treating a liquid which comprises causing the liquid to flow in electrical contact with pairs of positive and negative electrodes, maintaining within the liquid an electric potential gradient by means of said electrodes, separating the liquid around the positive electrode from the liquid around the negative electrode but maintaining electrical contact therebetween, and pretreating the liquid to be treated by means of the effluent liquid from a negative electrode.

25. A process of electro-osmotically treating a liquid which comprises causing the liquid to flow in electrical contact with pairs of positive and negative electrodes, maintaining within the liquid an electric potential gradient by means of said electrodes, separating the liquid around the positive electrode from the liquid around the negative electrode but maintaining electrical contact therebetween, and adding to the liquid to be treated before it comes in electrical contact with the positive and negative electrodes liquid which has already passed in contact with the negative electrode.

26. A process of electro-osmotically purifying water which comprises passing a body of water being purified in electrical contact with pairs of positive and negative electrodes, impressing upon the body of water being treated an electromotive force by means of such electrodes, separating the body of water around the positive electrode from the body of water around the negative electrode but permitting said bodies of water to remain in electrical contact with each other, and adding to the water to be treated before it comes into electrical contact with the electrodes a substantial portion of the effluent water which has been in contact with a negative electrode, said portion being so regulated so that it will constitute a minor portion of the water to be treated.

27. A process of electro-osmotically purifying water which comprises passing a body of water being purified in electrical contact with pairs of positive and negative electrodes, impressing upon the body of water being treated an electromotive force by means of such electrodes, separating the body of water around the positive electrode from the body of water around the negative electrode but permitting said bodies of water to remain in electrical contact with each other, and increasing the alkalinity of the water to be treated before it comes into contact with the positive and negative electrodes.

In testimony whereof I have hereunto subscribed my name.

ROBERT H. KEAN.

Certificate of Correction

Patent No. 1,840,105.   Granted January 5, 1932, to

ROBERT H. KEAN

It is hereby certified that error appears in the printed specification of the above-numbered patent requiring correction as follows: Page 2, line 5, for the misspelled word " princapal " read *principal;* page 3, line 117, for " affluent " read *effluent*, and line 124, strike out the word " and " second occurrence; page 4, after line 100, in the sentence following the asterisk for " $CaCO^3$ " read $CaCO_3$; page 5, line 80, for " above table " read *table below*, in line 97, for the misspelled word " vairous " read *various*, and line 125, first line of Table II—C, for " .060 " read *0.60;* page 7, line 66, claim 9, after the syllable " meter " insert *per centimeter* and line 71, claim 10, for " hydroxy " read *hydroxyl;* page 8, lines 9 and 10, for " electro-motive " read *electromotive;* and that the said Letters Patent should be read with these corrections therein that the same may conform to the record of the case in the Patent Office.

Signed and sealed this 5th day of April, A. D. 1932.

[SEAL.]

M. J. MOORE,
*Acting Commissioner of Patents.*